(12) United States Patent
Ryu

(10) Patent No.: US 11,843,885 B2
(45) Date of Patent: Dec. 12, 2023

(54) IMAGE SENSING DEVICE AND OPERATING METHOD THEREOF

(71) Applicant: SK hynix Inc., Gyeonggi-do (KR)

(72) Inventor: Choong Sik Ryu, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 224 days.

(21) Appl. No.: 17/085,848

(22) Filed: Oct. 30, 2020

(65) Prior Publication Data

US 2021/0377474 A1    Dec. 2, 2021

(30) Foreign Application Priority Data

May 28, 2020 (KR) .......................... 10-2020-0064429

(51) Int. Cl.
 *H04N 25/75* (2023.01)
 *H04N 25/671* (2023.01)
 *H04N 23/84* (2023.01)
 *H04N 25/76* (2023.01)

(52) U.S. Cl.
 CPC ........... *H04N 25/75* (2023.01); *H04N 23/843* (2023.01); *H04N 25/671* (2023.01); *H04N 25/76* (2023.01)

(58) Field of Classification Search
 CPC ...... H04N 5/378; H04N 5/3651; H04N 5/374; H04N 9/04515; H04N 5/3658; H04N 5/369; H04N 5/3698; H04N 25/75; H04N 23/843; H04N 25/671; H04N 25/76; H04N 25/677; H04N 25/70; H04N 25/709
 See application file for complete search history.

(56) References Cited

U.S. PATENT DOCUMENTS

| | | | |
|---|---|---|---|
| 9,769,408 B2 | 9/2017 | Kim et al. | |
| 2005/0012840 A1* | 1/2005 | Hsieh | H01L 27/14609 348/308 |
| 2006/0243885 A1* | 11/2006 | Watanabe | H04N 25/772 348/E3.018 |
| 2011/0290985 A1* | 12/2011 | Kume | H04N 25/77 250/208.1 |
| 2015/0136953 A1* | 5/2015 | Kim | H04N 5/378 250/208.1 |
| 2017/0237914 A1* | 8/2017 | Cho | H04N 5/3698 348/241 |
| 2020/0120292 A1* | 4/2020 | Cologlu | H04N 5/33 |
| 2021/0029314 A1* | 1/2021 | Urishihara | H04N 25/709 |
| 2021/0193056 A1* | 6/2021 | Piao | G09G 3/3275 |

FOREIGN PATENT DOCUMENTS

KR    10-2021-0032722 A    3/2021

* cited by examiner

*Primary Examiner* — Sinh Tran
*Assistant Examiner* — Zhenzhen Wu
(74) *Attorney, Agent, or Firm* — IP & T GROUP LLP

(57) ABSTRACT

Disclosed is an image sensing device including a pixel array including a plurality of pixels arranged in rows and columns, and suitable for outputting a plurality of pixel signals, and a plurality of readout circuits coupled to the pixel array, and suitable for compensating for readout deviations among the plurality of pixel signals, based on a plurality of bias voltages having different voltage levels, when reading out the plurality of pixel signals.

27 Claims, 15 Drawing Sheets

IMAGE SENSING DEVICE AND OPERATING METHOD THEREOF

CROSS-REFERENCE TO RELATED APPLICATION(S)

This application claims priority under 35 U.S.C. § 119 to Korean Patent Application No. 10-2020-0064429, filed on May 28, 2020, the disclosure of which is incorporated herein by reference in its entirety.

BACKGROUND

1. Field

Various embodiments of the present disclosure relate to a semiconductor design technique, and more particularly, to an image sensing device.

2. Description of the Related Art

Image sensing devices capture images using the property of a semiconductor which reacts to light. Generally, there are two types of image sensing devices: charge-coupled device (CCD) image sensing devices and complementary metal-oxide semiconductor (CMOS) image sensing devices. Recently, CMOS image sensing devices are widely used because they allow both analog and digital control circuits to be directly implemented on a single integrated circuit (IC).

SUMMARY

Various embodiments of the present disclosure are directed to an image sensing device for compensating for deterioration in characteristics that occur when pixel signals are read out.

In accordance with an embodiment, an image sensing device may include: a pixel array including a plurality of pixels arranged in rows and columns, and suitable for outputting a plurality of pixel signals; and a plurality of readout circuits coupled to the pixel array, and suitable for compensating for readout deviations among the plurality of pixel signals, based on a plurality of bias voltages having different voltage levels, when reading out the plurality of pixel signals.

The image sensing device may further include a bias voltage generation circuit suitable for generating the plurality of bias voltages, using first and second voltages having different voltage levels.

The bias voltage generation circuit may include: a first input buffer suitable for receiving the first voltage; a second input buffer suitable for receiving the second voltage; and a voltage divider coupled between the first input buffer and the second input buffer, and suitable for generating the plurality of bias voltages having voltage levels between the first and second voltages.

The image sensing device may further include: a low bias voltage generation circuit suitable for generating a plurality of low bias voltages among the plurality of bias voltages, using first and second low voltages having different voltage levels; and a high bias voltage generation circuit suitable for generating a plurality of high bias voltages among the plurality of bias voltages, using first and second high voltages having different voltage levels.

The low bias voltage generation circuit may include: a first input buffer suitable for receiving the first low voltage; a second input buffer suitable for receiving the second low voltage; and a first voltage divider coupled between the first input buffer and the second input buffer, and suitable for generating the plurality of low bias voltages having voltage levels between the first and second low voltages.

The high bias voltage generation circuit may include: a third input buffer suitable for receiving the first high voltage; a fourth input buffer suitable for receiving the second high voltage; and a second voltage divider coupled between the third input buffer and the fourth input buffer, and suitable for generating the plurality of high bias voltages having voltage levels between the first and second high voltages.

The plurality of readout circuits may positively compensate for the readout deviations among the plurality of pixel signals by decreasing the readout deviations among the plurality of pixel signals.

The plurality of readout circuits may negatively compensate for the readout deviations among the plurality of pixel signals by increasing the readout deviations among the plurality of pixel signals.

In accordance with an embodiment, an image sensing device may include: a pixel array including a plurality of pixels arranged in rows and columns, and suitable for outputting a first group of pixel signals and a second group of pixel signals for each row; a plurality of first readout circuits coupled to the pixel array, and suitable for compensating for readout deviations among the first group of pixel signals, based on a plurality of first bias voltages having different voltage levels, when reading out the first group of pixel signals; and a plurality of second readout circuits coupled to the pixel array, and suitable for compensating for readout deviations among the second group of pixel signals, based on a plurality of second bias voltages having different voltage levels, when reading out the second group of pixel signals.

In accordance with an embodiment, an image sensing device may include: a pixel array including a plurality of pixels arranged in rows and columns, and suitable for outputting a plurality of pixel signals to respective column lines; a plurality of detectors coupled to the respective lines, and suitable for outputting, to a plurality of output lines, a plurality of detection signals corresponding to respective voltage levels of the plurality of pixel signals; and a plurality of output buffers coupled to the respective output lines, and suitable for outputting, to a plurality of readout lines, a plurality of output signals corresponding to the respective detection signals based on respective bias voltages having different voltage levels.

Each of the plurality of output buffers may include: a first logic gate coupled between a supply terminal of a first power source voltage and a supply terminal of a second power source voltage, and suitable for performing a first logic operation on a corresponding detection signal and an enable signal; a second logic gate coupled between a first supply node and a second supply node, and suitable for performing a second logic operation on an output signal of the first logic gate; a first driving element coupled between the supply terminal of the first power source voltage and the first supply node, and suitable for driving the first supply node with the first power source voltage based on a corresponding bias voltage; a second driving element coupled between the supply terminal of the second power source voltage and the second supply node, and suitable for driving the second supply node with the second power source voltage based on the first power source voltage; and a third logic gate coupled between the supply terminal of the first power source voltage and the supply terminal of the second power source voltage, and suitable for outputting a corresponding output signal based on an output signal of the second logic gate.

Each of the plurality of output buffers may include: a first logic gate coupled between a supply terminal of a first power source voltage and a supply terminal of a second power source voltage, and suitable for performing a first logic operation on a corresponding detection signal and an enable signal; a second logic gate coupled between a first supply node and a second supply node, and suitable for performing a second logic operation on an output signal of the first logic gate; a first driving element coupled between the supply terminal of the first power source voltage and the first supply node, and suitable for driving the first supply node with the first power source voltage based on a corresponding first bias voltage; a second driving element coupled between the supply terminal of the second power source voltage and the second supply node, and suitable for driving the second supply node with the second power source voltage based on a corresponding second bias voltage; and a third logic gate coupled between the supply terminal of the first power source voltage and the supply terminal of the second power source voltage, and suitable for outputting a corresponding output signal based on an output signal of the second logic gate.

Each of the plurality of output buffers may include: a logic gate coupled between a first supply node and a second supply node, and suitable for performing a logic operation on a corresponding detection signal and an enable signal and outputting a corresponding output signal; a first driving element coupled between a supply terminal of a first power source voltage and the first supply node, and suitable for driving the first supply node with the first power source voltage based on a corresponding bias voltage; and a second driving element coupled between a supply terminal of a second power source voltage and the second supply node, and suitable for driving the second supply node with the second power source voltage based on the first power source voltage.

Each of the plurality of output buffers may include: a logic gate coupled between a first supply node and a second supply node, and suitable for performing a logic operation on a corresponding detection signal and an enable signal and outputting a corresponding output signal; a first driving element coupled between a supply terminal of a first power source voltage and the first supply node, and suitable for driving the first supply node with the first power source voltage based on a corresponding first bias voltage; and a second driving element coupled between a supply terminal of a second power source voltage and the second supply node, and suitable for driving the second supply node with the second power source voltage based on a corresponding second bias voltage.

The image sensing device may further include a bias voltage generation circuit suitable for generating the plurality of bias voltages, using first and second voltages having different voltage levels.

The bias voltage generation circuit may include: a first input buffer suitable for receiving the first voltage; a second input buffer suitable for receiving the second voltage; and a voltage divider coupled between the first input buffer and the second input buffer, and suitable for generating the plurality of bias voltages having voltage levels between the first and second voltages.

The image sensing device may further include: a low bias voltage generation circuit suitable for generating a plurality of low bias voltages among the plurality of bias voltages, using first and second low voltages having different voltage levels; and a high bias voltage generation circuit suitable for generating a plurality of high bias voltages among the plurality of bias voltages, using first and second high voltages having different voltage levels.

The low bias voltage generation circuit may include: a first input buffer suitable for receiving the first low voltage; a second input buffer suitable for receiving the second low voltage; and a first voltage divider coupled between the first input buffer and the second input buffer, and suitable for generating the plurality of low bias voltages having voltage levels between the first and second low voltages.

The high bias voltage generation circuit may include: a third input buffer suitable for receiving the first high voltage; a fourth input buffer suitable for receiving the second high voltage; and a second voltage divider coupled between the third input buffer and the fourth input buffer, and suitable for generating the plurality of high bias voltages having voltage levels between the first and second high voltages.

In accordance with an embodiment, an operating method of an image sensing device may include: generating a plurality of pixel signals which form a readout deviation pattern due to an internal layout within the device; and reducing or amplifying the deviation pattern by differently delaying at least some of the pixel signals by based on the pattern.

DETAILED DESCRIPTION

Various embodiments are described below with reference to the accompanying drawings to enable those skilled in art to which the present disclosure pertains practice and easily carry out the present invention.

Throughout the specification, when an element is referred to as being "connected to" or "coupled to" another element, the element may be directly connected or coupled to the another element, or electrically connected or coupled to the another element with one or more elements interposed therebetween. In addition, it will also be understood that the terms "comprises," "comprising," "includes," and "including" when used herein, specify the presence of the stated elements and do not preclude the presence or addition of one or more other elements. In the following description, a component described in singular form does not preclude there being multiple instances of such component. Throughout the specification, reference to "an embodiment," "a first embodiment" or a "second embodiment" does not necessarily refer to only one embodiment, and the term "embodiments" when used herein does not necessarily refer to all embodiments.

Figure 1:
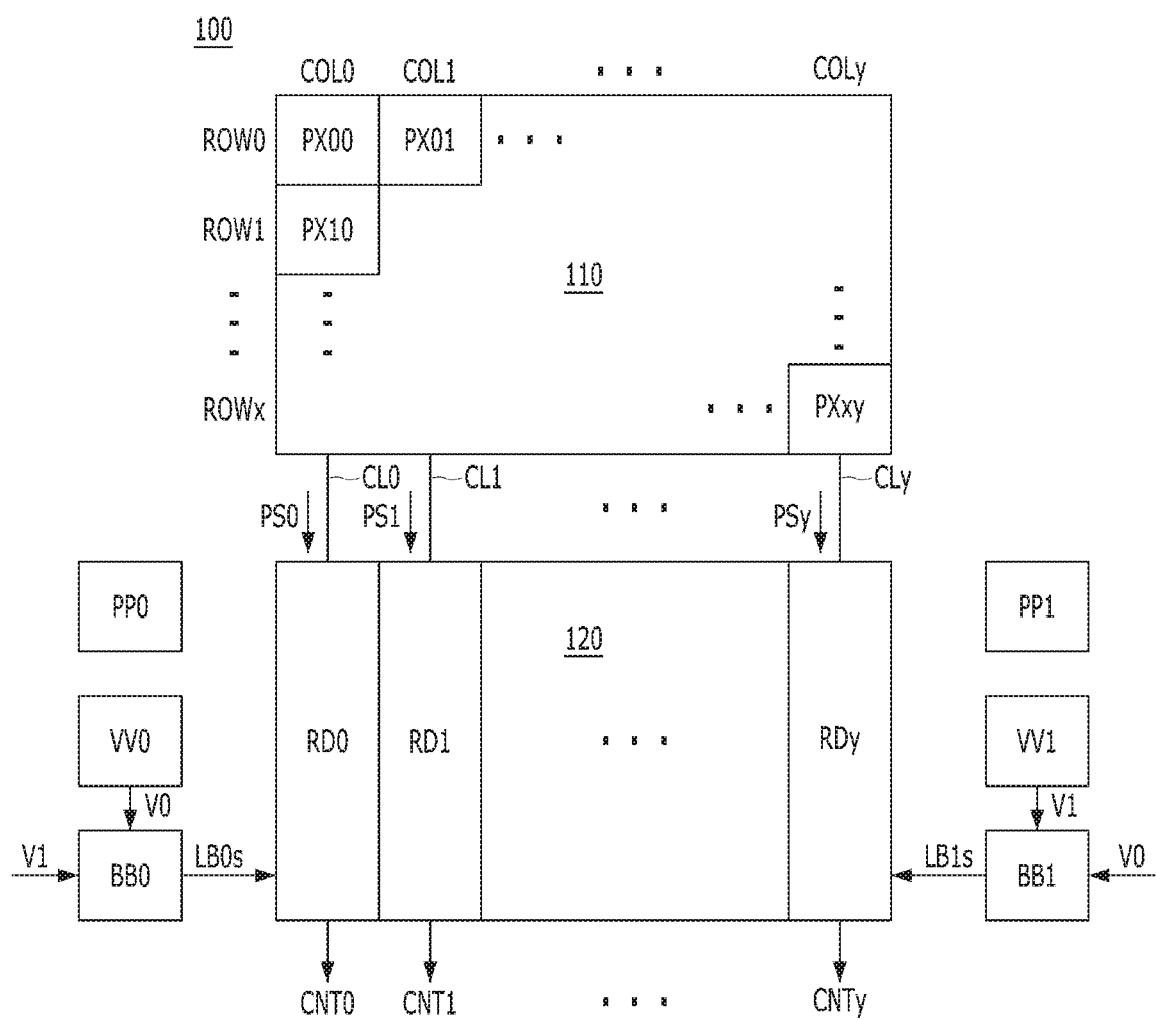
FIG. 1 is a block diagram illustrating an image sensing device in accordance with a first embodiment of the present disclosure.

FIG. 1 is a block diagram illustrating an image sensing device 100 in accordance with a first embodiment of the present disclosure.

Referring to FIG. 1, the image sensing device 100 may include a pixel region 110, a readout region 120, power source supplying regions PP0 and PP1, a first voltage generation circuit VV0, a second voltage generation circuit VV1, a first bias voltage generation circuit BB0 and a second bias voltage generation circuit BB1.

The pixel region 110 may include a pixel array. The pixel array may include a plurality of pixels PX00 to PXxy arranged along rows and columns (where "x" and "y" are natural numbers). For example, the plurality of pixels PX00 to PXxy may be arranged in first to $(x+1)^{th}$ rows ROW0 to ROWx and first to $(y+1)^{th}$ columns COL0 to COLy. The pixel array may output a plurality of pixel signals PS0 to PSy to a plurality of column lines CL0 to CLy. For example, the first to $(y+1)^{th}$ pixels PX00 to PX0y arranged in the first row ROW0 may output the first to $(y+1)^{th}$ pixel signals PS0 to PSy to the first to $(y+1)^{th}$ column lines CL0 to CLy during a first single row time period, and the first to $(y+1)^{th}$ pixels PXx0 to PXxy arranged in the $(x+1)^{th}$ row ROWx may output the first to $(y+1)^{th}$ pixel signals PS0 to PSy to the first to $(y+1)^{th}$ column lines CL0 to CLy during a $(x+1)^{th}$ single row time period.

The readout region 120 may include a plurality of readout circuits RD0 to RDy, which may be coupled to the pixel array through the plurality of column lines CL0 to CLy, respectively, to read out the plurality of pixel signals PS0 to PSy, respectively. For example, the first to $(y+1)^{th}$ readout circuits RD0 to RDy may be coupled to the first to $(y+1)^{th}$ column lines CL0 to CLy, and read out the first to $(y+1)^{th}$ pixel signals PS0 to PSy, which are outputted through the first to $(y+1)^{th}$ column lines CL0 to CLy, as first to $(y+1)^{th}$ count signals CNT0 to CNTy, respectively.

In addition, the plurality of readout circuits RD0 to RDy may compensate for readout deviations among the plurality of pixel signals PS0 to PSy based on a plurality of low bias voltages LB0s and LB1s having different voltage levels when reading out the pixel signals PS0 to PSy. For example, the plurality of readout circuits RD0 to RDy may positively compensate for the readout deviations among the plurality of pixel signals PS0 to PSy by delaying the plurality of pixel signals PS0 to PSy by different delay amounts. The positive compensation for the readout deviations refers to decreasing or eliminating the readout deviations among the plurality of pixel signals PS0 to PSy. For another example, the plurality of readout circuits RD0 to RDy may negatively compensate for the readout deviations among the plurality of pixel signals PS0 to PSy by delaying the plurality of pixel signals PS0 to PSy by different delay amounts. The negative compensation for the readout deviations refers to increasing or amplifying the readout deviations among the plurality of pixel signals PS0 to PSy.

The power source supplying regions PP0 and PP1 may include a first power source supplying circuit PP0 and a second power source supplying circuit PP1, respectively. The first and second power source supplying circuits PP0 and PP1 may generate high and low power source voltages for the readout region 120, and supply the high and low power source voltages to the readout region 120. For example, the first and second power source supplying circuits PP0 and PP1 may supply the high and low power source voltages in common to the plurality of readout circuits RD0 to RDy included in the readout region 120. The first power source supplying circuit PP0 may be disposed closest to the first readout circuit RD0 among the plurality of readout circuits RD0 to RDy, and the second power source supplying circuit PP1 may be disposed closest to the $(y+1)^{th}$ readout circuit RDy among the plurality of readout circuits RD0 to RDy.

The first voltage generation circuit VV0 may generate a first voltage V0, and provide the first and second bias voltage generation circuits BB0 and BB1 with the first voltage V0.

The second voltage generation circuit VV1 may generate a second voltage V1 having a different voltage level from the first voltage V0, and provide the first and second bias voltage generation circuits BB0 and BB1 with the second voltage V1.

The first bias voltage generation circuit BM may generate the low bias voltages LB0s of a first group among the plurality of low bias voltages LB0s and LB1s based on the first and second voltages V0 and V1. The low bias voltages LB0s of the first group may be outputted to the readout circuits which are disposed on one side and correspond to half of the plurality of readout circuits RD0 to RDy.

The second bias voltage generation circuit BB1 may generate the low bias voltages LB1s of a second group among the plurality of low bias voltages LB0s and LB1s based on the first and second voltages V0 and V1. The low bias voltages LB1s of the second group may be outputted to the readout circuits which are disposed on the other side and correspond to the other half of the plurality of readout circuits RD0 to RDy.

Figure 2:
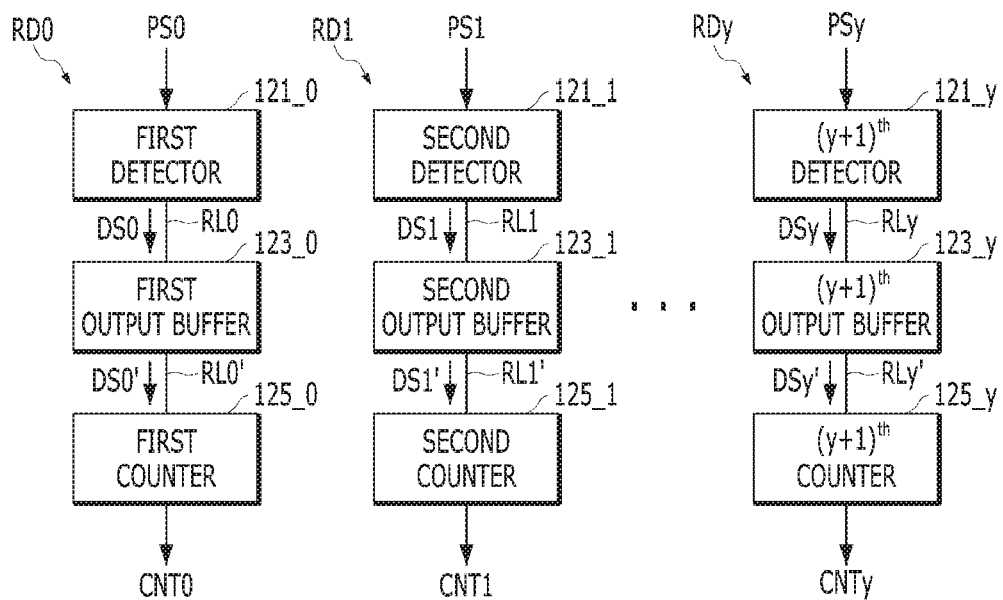
FIG. 2 is a block diagram illustrating a plurality of readout circuits, such as those illustrated in FIG. 1.

FIG. 2 is a block diagram illustrating the plurality of readout circuits RD0 to RDy illustrated in FIG. 1.

Referring to FIG. 2, the first readout circuit RD0 may include a first detector 121_0, a first output buffer 123_0 and a first counter 125_0.

The first detector 121_0 may be coupled to the first column line CL0. The first detector 121_0 may receive the first pixel signal PS0 through the first column line CL0, and output a first detection signal DS0, corresponding to a voltage level of the first pixel signal PS0, to a first output line RL0. For example, the first detector 121_0 may include a comparator. The comparator may compare a ramp signal (not illustrated) with the first pixel signal PS0, and generate the first detection signal DS0 corresponding to the comparison result.

The first output buffer 123_0 may be coupled to the first output line RL0. The first output buffer 123_0 may output a first output signal DS0', corresponding to the first detection signal DS0, to a first readout line RL0' based on a first low bias voltage LB00 among the low bias voltages LB0s of the first group. For example, the first output buffer 123_0 may delay the first detection signal DS0 by a delay amount corresponding to a voltage level of the first low bias voltage LB00, and output the delayed first detection signal as the first output signal DS0'.

The first counter 125_0 may be coupled to the first readout line RL0'. The first counter 125_0 may count the first output signal DS0', and output the first count signal CNT0.

Since the second to $(y+1)^{th}$ readout circuits RD1 to RDy may be configured similarly to the first readout circuit RD0, description thereof is omitted. However, second to $(y+1)^{th}$ output buffers 123_1 to 123_y may receive second to $(y+1)^{th}$ low bias voltages LB01 to LB1y, respectively, among the plurality of low bias voltages LB0s and LB1y.

Figure 3:
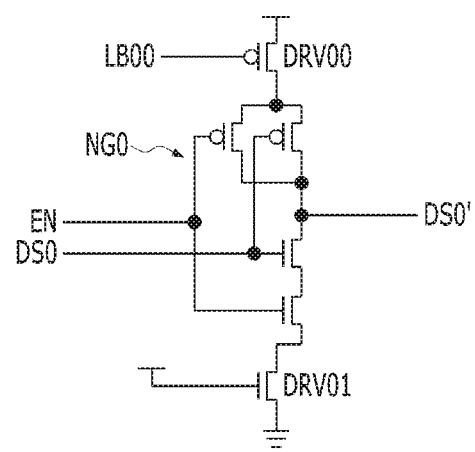
FIG. 3 is a circuit diagram illustrating an example of a first output buffer, such as that illustrated in FIG. 2.

FIG. 3 is a circuit diagram illustrating an example of the first output buffer 123_0 illustrated in FIG. 2.

Referring to FIG. 3, the first output buffer 123_0 may include a logic gate NG0, a first driving element DRV00 and a second driving element DRV01.

The logic gate NG0 may be coupled between a first supply node and a second supply node. The logic gate NG0 may output the first output signal DS0' by performing a logic operation on the first detection signal DS0 and an enable signal EN. For example, the logic gate NG0 may include a NAND gate implemented with two PMOS transistors and two NMOS transistors.

The first driving element DRV00 may be coupled between a supply terminal of the high power source voltage and the first supply node. The first driving element DRV00 may drive the first supply node with the high power source voltage based on the first low bias voltage LB00. For example, the first driving element DRV00 may include a PMOS transistor.

The second driving element DRV01 may be coupled between a supply terminal of the low power source voltage and the second supply node. The second driving element DRV01 may drive the second supply node with the low power source voltage based on the high power source voltage. For example, the second driving element DRV01 may include an NMOS transistor.

The first output buffer 123_0 having the above-described configuration may generate the first output signal DS0' that transitions from a logic low level to a logic high level when the first detection signal DS0 transitions from a logic high level to a logic low level. Particularly, the first output buffer 123_0 may adjust a delay amount of the first output signal DS0' by adjusting a slope of the first output signal DS0' to be more gradual according to the voltage level of the first low bias voltage LB00 when the first output signal DS0' transitions from the logic low level to the logic high level. Accordingly, it is desirable that the first output buffer 123_0 according to the present example is applied to a readout circuit designed to allow the first detection signal DS0 to transition from the logic high level to the logic low level.

Figure 4:
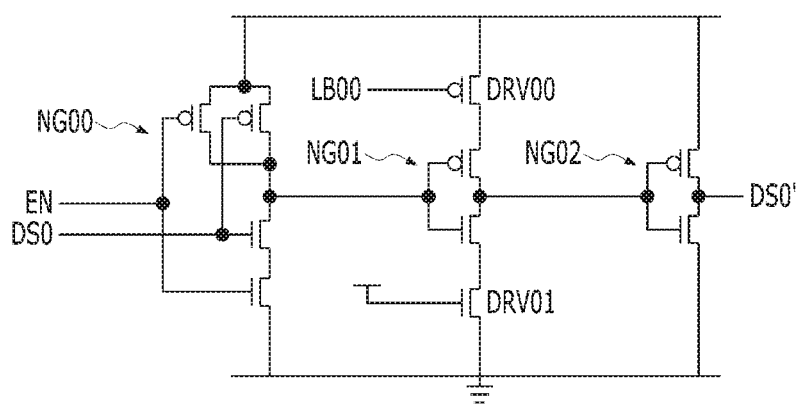
FIG. 4 is a circuit diagram illustrating another example of a first output buffer, such as that illustrated in FIG. 2.

FIG. 4 is a circuit diagram illustrating another example of the first output buffer 123_0 illustrated in FIG. 2.

Referring to FIG. 4, the first output buffer 123_0 may include a first logic gate NG00, a second logic gate NG01, a first driving element DRV00, a second driving element DRV01 and a third logic gate NG02.

The first logic gate NG00 may be coupled between a supply terminal of the high power source voltage and a supply terminal of the low power source voltage. The first logic gate NG00 may perform a logic operation on the first detection signal DS0 and an enable signal EN. For example, the first logic gate NG00 may include a NAND gate implemented with two PMOS transistors and two NMOS transistors.

The second logic gate NG01 may be coupled between a first supply node and a second supply node. The second logic gate NG01 may perform a logic operation on an output signal of the first logic gate NG00. For example, the second logic gate NG01 may include a NOT gate implemented with one PMOS transistor and one NMOS transistor.

The first driving element DRV00 may be coupled between the supply terminal of the high power source voltage and the first supply node. The first driving element DRV00 may drive the first supply node with the high power source voltage based on the first low bias voltage LB00. For example, the first driving element DRV00 may include a PMOS transistor.

The second driving element DRV01 may be coupled between the supply terminal of the low power source voltage and the second supply node. The second driving element DRV01 may drive the second supply node with the low power source voltage based on the high power source voltage. For example, the second driving element DRV01 may include an NMOS transistor.

The third logic gate NG02 may be coupled between the supply terminal of the high power source voltage and the supply terminal of the low power source voltage. The third logic gate NG02 may output the first output signal DS0' by performing a logic operation on an output signal of the second logic gate NG01. For example, the third logic gate NG02 may include a NOT gate implemented with one PMOS transistor and one NMOS transistor.

The first output buffer 123_0 having the above-described configuration may generate the first output signal DS0' that transitions from a logic high level to a logic low level when the first detection signal DS0 transitions from a logic low level to a logic high level. Particularly, the first output buffer 123_0 may adjust a delay amount of the output signal of the second logic gate NG01 by adjusting a slope of the output signal of the second logic gate NG01 to be more gradual according to the voltage level of the first low bias voltage LB00 when the output signal of the second logic gate NG01 transitions from a logic low level to a logic high level. In addition, as the first output buffer 123_0 outputs the first output signal DS0' through the third logic gate NG02, the first output buffer 123_0 may output the first output signal DS0' whose slope is restored to be steep while the delay amount of the second logic gate NG01 is maintained. Accordingly, it is desirable that the first output buffer 123_0 according to the present example is applied to a readout circuit designed to allow the first detection signal DS0 to transition from the logic low level to the logic high level.

Figure 5:
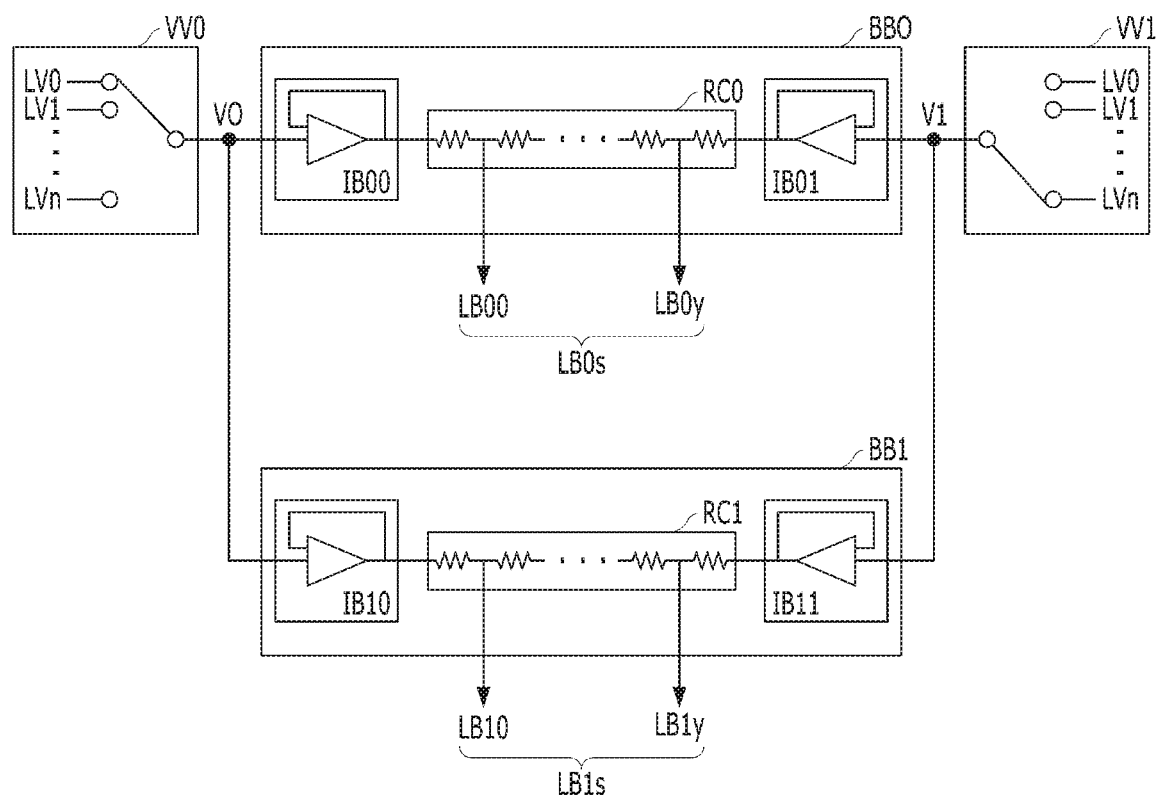
FIG. 5 is a circuit diagram illustrating an example of a first voltage generation circuit, a second voltage generation circuit and a first bias voltage generation circuit, such as those illustrated in FIG. 1.

FIG. 5 is a circuit diagram illustrating the first and second voltage generation circuits VV0 and VV1 and the first and second bias voltage generation circuits BB0 and BB1 illustrated in FIG. 1.

Referring to FIG. 5, the first voltage generation circuit VV0 may generate a plurality of low voltages LV0 to LVn, and output any one of the plurality of low voltages LV0 to LVn as the first voltage V0 via a switch mechanism within the first voltage generation circuit VV0. For example, the first voltage generation circuit VV0 may generate the plurality of low voltages LV0 to LVn using the high and low power source voltages.

The second voltage generation circuit VV1 may generate a plurality of low voltages LV0 to LVn, one of which (except the one selected as V0) may be selected as the second voltage V1. For example, the second voltage generation circuit VV1 may generate the plurality of low voltages LV0 to LVn using the high and low power source voltages.

The first bias voltage generation circuit BB0 may include a first input buffer IB00, a second input buffer IB01 and a first voltage divider RC0. The first input buffer IB00 may receive the first voltage V0. For example, the first input buffer IB00 may include a unit gain amplifier. The second input buffer IB01 may receive the second voltage V1. For example, the second input buffer IB01 may include a unit gain amplifier. The first voltage divider RC0 may be coupled between the first input buffer IB00 and the second input buffer IB01. The first voltage divider RC0 may generate the low bias voltages LB0s of the first group having voltage levels between the first voltage V0 and the second voltage V1. For example, the first voltage divider RC0 may include a plurality of resistors coupled in series to one another.

The second bias voltage generation circuit BB1 may include a third input buffer IB10, a fourth input buffer IB11 and a second voltage divider RC1. The third input buffer IB10 may receive the first voltage V0. For example, the third input buffer IB10 may include a unit gain amplifier. The fourth input buffer IB11 may receive the second voltage V1. For example, the fourth input buffer IB11 may include a unit gain amplifier. The second voltage divider RC1 may be coupled between the third input buffer IB10 and the fourth input buffer IB611. The second voltage divider RC1 may generate the low bias voltages LB1s of the second group having voltage levels between the first voltage V0 and the second voltage V1. For example, the second voltage divider RC1 may include a plurality of resistors coupled in series to one another.

Figure 6:
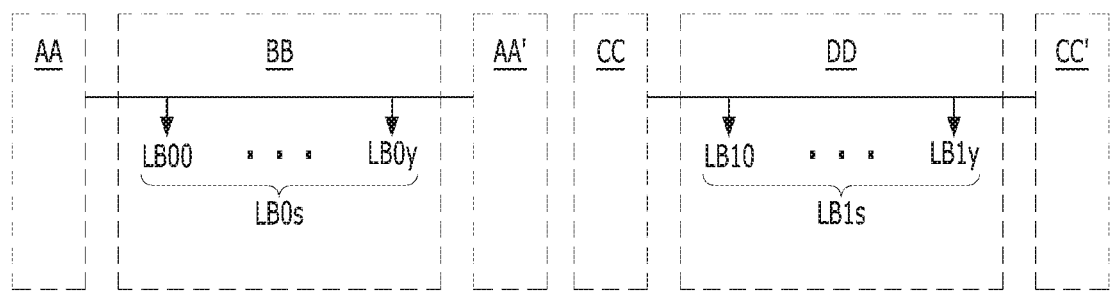
FIG. 6 is a diagram illustrating dispositions of first to $(y+1)^{th}$ output buffers, such as those illustrated in FIG. 2 and dispositions of first to fourth input buffers, such as those illustrated in FIG. 5.

FIG. 6 is a diagram illustrating dispositions of the first to $(y+1)^{th}$ output buffers 123_0 to 123_y illustrated in FIG. 2 and dispositions of the first to fourth input buffers IB00, IB01, IB10 and IB11 illustrated in FIG. 5.

Referring to FIG. 6, output buffers of a first group among the first to $(y+1)^{th}$ output buffers 123_0 to 123_y may be disposed in one region BB of the readout region 120. The output buffers of the first group refer to the output buffers which are disposed on one side and correspond to half of the first to $(y+1)^{th}$ output buffers 123_0 to 123_y.

The first input buffer IB00 may be disposed in a left region AA of the one region BB.

The second input buffer IB01 may be disposed in a right region AA' of the one region BB.

Output buffers of a second group among the first to $(y+1)^{th}$ output buffers 123_0 to 123_y may be disposed in the other region DD of the readout region 120. The output buffers of the second group refer to the output buffers which are disposed on the other side and correspond to the other half of the first to $(y+1)^{th}$ output buffers 123_0 to 123_y.

The third input buffer IB10 may be disposed in a right region CC' of the other region DD.

The fourth input buffer IB11 may be disposed in a left region CC of the other region DD.

Hereinafter, operations of the image sensing device 100 having the above-described configuration according to the first embodiment of the present disclosure is described with reference to FIGS. 7 and 8.

Figure 7:
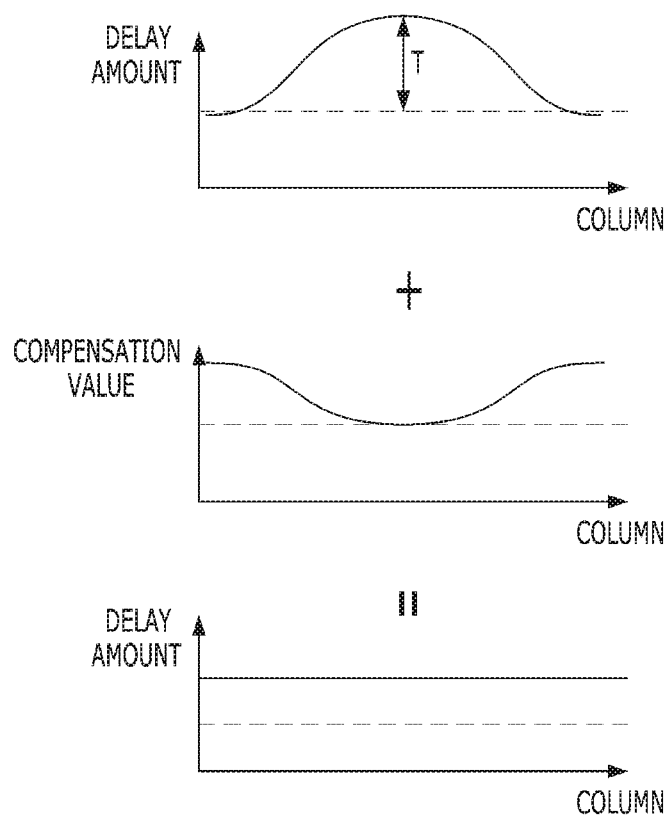
FIG. 7 is a graph for describing an operation related to positive compensation among operations of an image sensing device, such as that illustrated in FIG. 1.

FIG. 7 is a graph for describing an operation related to the positive compensation among the operations of the image sensing device 100 illustrated in FIG. 1.

Referring to FIG. 7, readout deviations T may occur among the plurality of pixel signals PS0 to PSy. More particularly, the readout deviations T may occur among a plurality of detection signals DS0 to DSy. The reason why the graph representing the readout deviations T has a convex shape in the center of the column-axis may be associated with dispositions of the first and second power source supplying circuits PP0 and PP1. In other words, when the first power source supplying circuit PP0 is disposed closest to the first detector 121_0 and the second power source supplying circuit PP1 is disposed closest to a $(y+1)^{th}$ detector 121_y, the voltage levels of the high and low power source voltages becomes more degraded as the receiving detector is disposed closer to the center of a plurality of detectors 121_0 to 121_y. The most degraded voltage levels of the high and low power source voltages are supplied to a detector disposed in the center of a plurality of detectors 121_0 to 121_y. Accordingly, the plurality of detection signals DS0 to DSy may be outputted with different delay amounts according to different distances from the first and second power source supplying circuits PP0 and PP1 to the respective detectors, so that the readout deviations T may occur among the plurality of detection signals DS0 to DSy.

The plurality of output buffers 123_0 to 123_y may positively compensate for the readout deviations T among the plurality of detection signals DS0 to DSy based on the plurality of low bias voltages LB0s and LB1s having different voltage levels. For example, the plurality of output buffers 123_0 to 123_y may positively compensate for the readout deviations T among the plurality of detection signals DS0 to DSy by reflecting a delay amount corresponding to a relatively large compensation value to the plurality of detection signals DS0 to DSy as the distances between the first or second power source supplying circuit PP0 or PP1 and the respective detectors decrease, and by reflecting a delay amount corresponding to a relatively small compensation value to the plurality of detection signals DS0 to DSy as the distances between the first or second power source supplying circuit PP0 or PP1 and the respective detectors increase. Accordingly, there may be almost no difference in delay amount among the plurality of output signals DS0' to DSy' by reducing or eliminating the readout deviations T among the plurality of detection signals DS0 to DSy according to the positive compensation.

Figure 8:
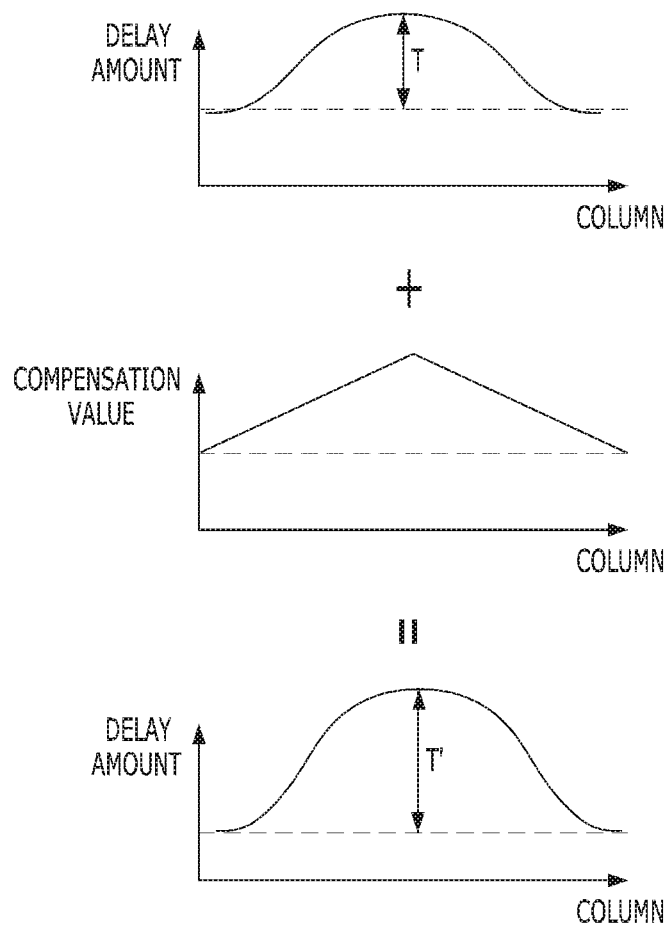
FIG. 8 is a graph for describing an operation related to negative compensation among operations of an image sensing device, such as that illustrated in FIG. 1.

FIG. 8 is a graph for describing an operation related to the negative compensation among the operations of the image sensing device 100 illustrated in FIG. 1.

Referring to FIG. 8, readout deviations T may occur among the plurality of pixel signals PS0 to PSy. More specifically, the readout deviations T may occur among the plurality of detection signals DS0 to DSy. In FIG. 8, the reason why the graph representing the readout deviations T has a convex shape in the center of the column-axis has been described above, and therefore, description thereof is omitted here (refer to FIG. 7).

The plurality of output buffers 123_0 to 123_y may negatively compensate for the readout deviations T among the plurality of detection signals DS0 to DSy based on the plurality of low bias voltages LB0s and LB1s having different voltage levels. For example, the plurality of output buffers 123_0 to 123_y may negatively compensate for the readout deviations T among the plurality of detection signals DS0 to DSy by reflecting a delay amount corresponding to a relatively small compensation value to the plurality of detection signals DS0 to DSy as the distances between the first or second power source supplying circuit PP0 or PP1 and the respective detectors decrease, and by reflecting a delay amount corresponding to a relatively large compensation value to the plurality of detection signals DS0 to DSy as the distances between the first or second power source supplying circuit PP0 or PP1 and the respective detectors increase. Accordingly, readout deviations T' among the plurality of output signals DS0' to DSy' may be increased more than the readout deviations T among the plurality of detection signals DS0 to DSy by increasing or amplifying the readout deviations T among the plurality of detection signals DS0 to DSy according to the negative compensation.

A plurality of counters 125_0 to 125_y may output the plurality of count signals CNT0 to CNTy corresponding to the plurality of output signals DS0' to DSy', respectively. When the plurality of counters 125_0 to 125_y are controlled at similar timings, peak noise may occur due to the plurality of counters 125_0 to 125_y. However, since the readout deviations are present among the plurality of output signals DS0 to DSy', the peak noise may be dispersed due to the plurality of counters 125_0 to 125_y.

Figure 9:
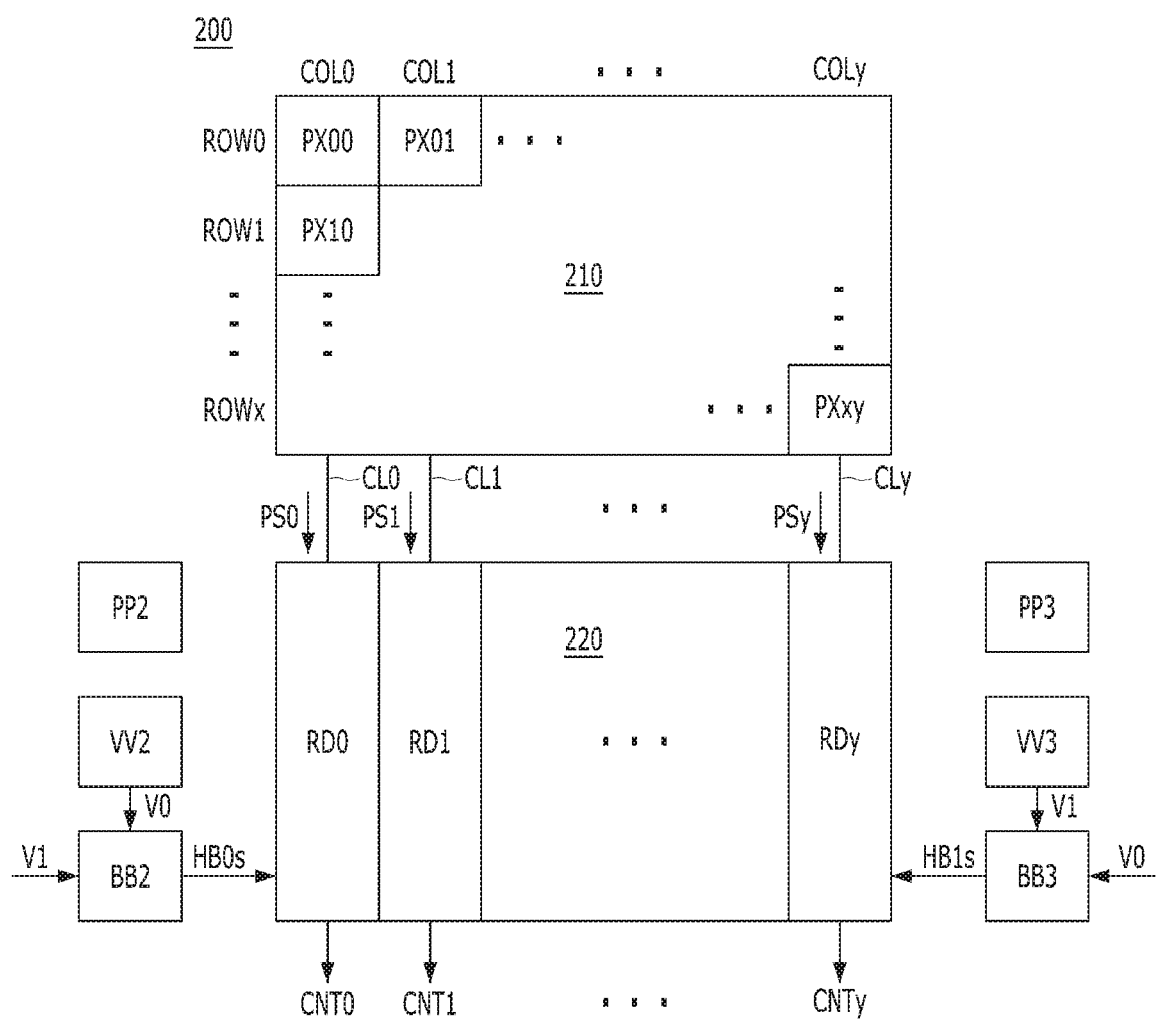
FIG. 9 is a block diagram illustrating an image sensing device in accordance with a second embodiment of the present disclosure.

FIG. 9 is a block diagram illustrating an image sensing device 200 in accordance with a second embodiment of the present disclosure.

Referring to FIG. 9, the image sensing device 200 may include a pixel region 210, a readout region 220, power source supplying regions PP2 and PP3, a first voltage generation circuit VV2, a second voltage generation circuit VV3, a first bias voltage generation circuit BB2 and a second bias voltage generation circuit BB3.

The pixel region 210 may include a pixel array. The pixel array may include a plurality of pixels PX00 to PXxy arranged along rows and columns (where "x" and "y" are natural numbers). For example, the plurality of pixels PX00 to PXxy may be arranged in first to $(x+1)^{th}$ rows ROW0 to ROWx and first to $(y+1)^{th}$ columns COL0 to COLy. The pixel array may output a plurality of pixel signals PS0 to PSy to a plurality of column lines CL0 to CLy. For example, the first to $(y+1)^{th}$ pixels PX00 to PX0y arranged in the first row ROW0 may output the first to $(y+1)^{th}$ pixel signals PS0 to PSy to the first to $(y+1)^{th}$ column lines CL0 to CLy during a first single row time period, and the first to $(y+1)^{th}$ pixels PXx0 to PXxy arranged in the $(x+1)^{th}$ row ROWx may output the first to $(y+1)^{th}$ pixel signals PS0 to PSy to the first to $(y+1)^{th}$ column lines CL0 to CLy during a $(x+1)^{th}$ single row time period.

The readout region 220 may include a plurality of readout circuits RD0 to RDy, which may be coupled to the pixel array through the plurality of column lines CL0 to CLy, respectively to read out the plurality of pixel signals PS0 to PSy, respectively. For example, the first to $(y+1)^{th}$ readout circuits RD0 to RDy may be coupled to the first to $(y+1)^{th}$ column lines CL0 to CLy, and read out the first to $(y+1)^{th}$ pixel signals PS0 to PSy, which are outputted through the first to $(y+1)^{th}$ column lines CL0 to CLy, as first to $(y+1)^{th}$ count signals CNT0 to CNTy, respectively.

In addition, the plurality of readout circuits RD0 to RDy may compensate for readout deviations among the plurality of pixel signals PS0 to PSy based on a plurality of high bias voltages HB0s and HB1s having different voltage levels when reading out the pixel signals PS0 to PSy. For example, the plurality of readout circuits RD0 to RDy may positively compensate for the readout deviations among the plurality of pixel signals PS0 to PSy by delaying the plurality of pixel signals PS0 to PSy by different delay amounts. The positive compensation for the readout deviations refers to decreasing or eliminating the readout deviations among the plurality of pixel signals PS0 to PSy. For another example, the plurality of readout circuits RD0 to RDy may negatively compensate for the readout deviations among the plurality of pixel signals PS0 to PSy by delaying the plurality of pixel signals PS0 to PSy by different delay amounts. The negative compensation for the readout deviations refers to increasing or amplifying the readout deviations among the plurality of pixel signals PS0 to PSy.

The power source supplying regions PP2 and PP3 may include a first power source supplying circuit PP2 and a second power source supplying circuit PP3, respectively. The first and second power source supplying circuits PP2 and PP3 may generate high and low power source voltages for the readout region 220, and supply the high and low power source voltages to the readout region 220. For example, the first and second power source supplying circuits PP2 and PP3 may supply the high and low power source voltages in common to the plurality of readout circuits RD0 to RDy included in the readout region 220. The first power source supplying circuit PP2 may be disposed closest to the first readout circuit RD0 among the plurality of readout circuits RD0 to RDy, and the second power source supplying circuit PP3 may be disposed closest to the $(y+1)^{th}$ readout circuit RDy among the plurality of readout circuits RD0 to RDy.

The first voltage generation circuit VV2 may generate a first voltage V0, and provide the first and second bias voltage generation circuits BB2 and BB3 with the first voltage V0.

The second voltage generation circuit VV3 may generate a second voltage V1 having a different voltage level from the first voltage V0, and provide the first and second bias voltage generation circuits BB2 and BB3 with the second voltage V1.

The first bias voltage generation circuit BB2 may generate the high bias voltages HB0s of a first group among the plurality of high bias voltages HB0s and HB1s based on the first and second voltages V0 and V1 The high bias voltages HB0s of the first group may be outputted to the readout circuits which are disposed on one side and correspond to half of the plurality of readout circuits RD0 to RDy.

The second bias voltage generation circuit BB3 may generate the high bias voltages HB1s of a second group among the plurality of high bias voltages HB0s and HB1s based on the first and second voltages V0 and V1. The high bias voltages HB1s of the second group may be outputted to the readout circuits which are disposed on the other side and correspond to the other half of the plurality of readout circuits RD0 to RDy.

Figure 10:
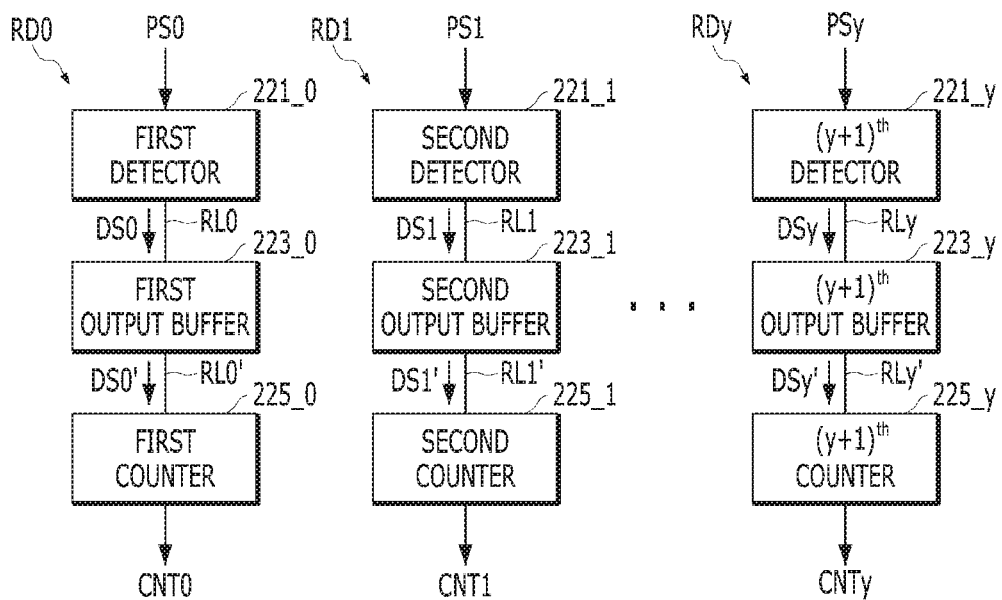
FIG. 10 is a block diagram illustrating a plurality of readout circuits, such as those illustrated in FIG. 9.

FIG. 10 is a block diagram illustrating the plurality of readout circuits RD0 to RDy illustrated in FIG. 9.

Referring to FIG. 10, the first readout circuit RD0 may include a first detector 221_0, a first output buffer 223_0 and a first counter 225_0.

The first detector 221_0 may be coupled to the first column line CL0. The first detector 221_0 may receive the first pixel signal PS0 through the first column line CL0, and output a first detection signal DS0, corresponding to a voltage level of the first pixel signal PS0, to a first output line RL0. For example, the first detector 221_0 may include a comparator. The comparator may compare a ramp signal (not illustrated) with the first pixel signal PS0, and generate the first detection signal DS0 corresponding to the comparison result.

The first output buffer 223_0 may be coupled to the first output line RL0. The first output buffer 223_0 may output a first output signal DS0', corresponding to the first detection signal DS0, to a first readout line RL0' based on a first high bias voltage HB00 among the high bias voltages HB0s of the first group. For example, the first output buffer 223_0 may delay the first detection signal DS0 by a delay amount corresponding to a voltage level of the first high bias voltage HB00, and output the delayed first detection signal as the first output signal DS0'.

The first counter 225_0 may be coupled to the first readout line RL0'. The first counter 225_0 may count the first output signal DS0°, and output the first count signal CNT0.

Since the second to (y+1)$^{th}$ readout circuits RD1 to RDy may be configured similarly to the first readout circuit RD0, description thereof is omitted. However, second to (y+1)$^{th}$ output buffers 223_1 to 223_y may receive second to (y+1)$^{th}$ high bias voltages HB01 to HB1y, respectively, among the plurality of high bias voltages HB0s and HB1y.

Figure 11:
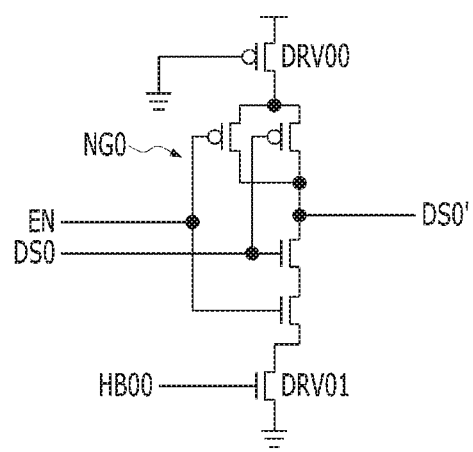
FIG. 11 is a circuit diagram illustrating an example of a first output buffer, such as that illustrated in FIG. 10.

FIG. 11 is a circuit diagram illustrating an example of the first output buffer 223_0 illustrated in FIG. 10.

Referring to FIG. 11, the first output buffer 223_0 may include a logic gate NG0, a first driving element DRV00 and a second driving element DRV01.

The logic gate NG0 may be coupled between a first supply node and a second supply node. The logic gate NG0 may output the first output signal DS0' by performing a logic operation on the first detection signal DS0 and an enable signal EN. For example, the logic gate NG0 may include a NAND gate implemented with two PMOS transistors and two NMOS transistors.

The first driving element DRV00 may be coupled between a supply terminal of the high power source voltage and the first supply node. The first driving element DRV00 may drive the first supply node with the high power source voltage based on the low power source voltage. For example, the first driving element DRV00 may include a PMOS transistor.

The second driving element DRV01 may be coupled between a supply terminal of the low power source voltage and the second supply node. The second driving element DRV01 may drive the second supply node with the low power source voltage based on the first high bias voltage HB00. For example, the second driving element DRV01 may include an NMOS transistor.

The first output buffer 223_0 having the above-described configuration may generate the first output signal DS0' that transitions from a logic high level to a logic low level when the first detection signal DS0 transitions from a logic low level to a logic high level. Particularly, the first output buffer 223_0 may adjust a delay amount of the first output signal DS0' by adjusting a slope of the first output signal DS0' to be more gradual according to the voltage level of the first high bias voltage HB00 when the first output signal DS0' transitions from the logic high level to the logic low level. Accordingly, it is desirable that the first output buffer 223_0 according to the present example is applied to a readout circuit designed to allow the first detection signal DS0 to transition from the logic low level to the logic high level.

Figure 12:
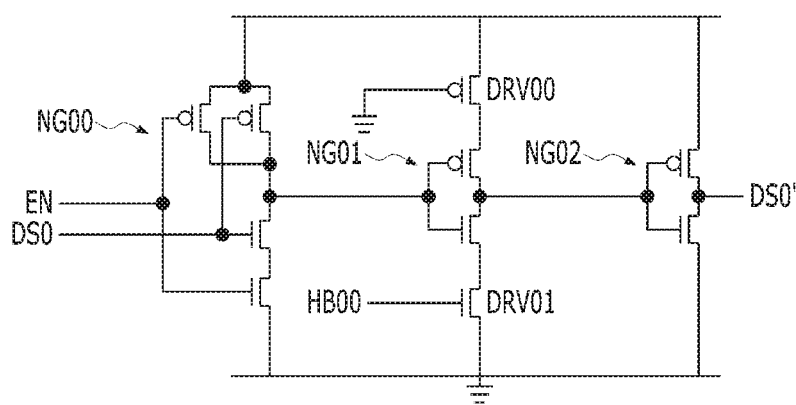
FIG. 12 is a circuit diagram illustrating another example of a first output buffer, such as that illustrated in FIG. 10.

FIG. 12 is a circuit diagram illustrating another example of the first output buffer 223_0 illustrated in FIG. 10.

Referring to FIG. 12, the first output buffer 223_0 may include a first logic gate NG00, a second logic gate NG01, a first driving element DRV00, a second driving element DRV01 and a third logic gate NG02.

The first logic gate NG00 may be coupled between a supply terminal of the high power source voltage and a supply terminal of the low power source voltage. The first logic gate NG00 may perform a logic operation on the first detection signal DS0 and an enable signal EN. For example, the first logic gate NG00 may include a NAND gate implemented with two PMOS transistors and two NMOS transistors.

The second logic gate NG01 may be coupled between a first supply node and a second supply node. The second logic gate NG01 may perform a logic operation on an output signal of the first logic gate NG00. For example, the second logic gate NG01 may include a NOT gate implemented with one PMOS transistor and one NMOS transistor.

The first driving element DRV00 may be coupled between the supply terminal of the high power source voltage and the first supply node. The first driving element DRV00 may drive the first supply node with the high power source voltage based on the low power source voltage. For example, the first driving element DRV00 may include a PMOS transistor.

The second driving element DRV01 may be coupled between the supply terminal of the low power source voltage and the second supply node. The second driving element DRV01 may drive the second supply node with the low power source voltage based on the first high bias voltage HB00. For example, the second driving element DRV01 may include an NMOS transistor.

The third logic gate NG02 may be coupled between the supply terminal of the high power source voltage and the supply terminal of the low power source voltage. The third logic gate NG02 may output the first output signal DS0' by performing a logic operation on an output signal of the second logic gate NG01. For example, the third logic gate NG02 may include a NOT gate implemented with one PMOS transistor and one NMOS transistor.

The first output buffer 223_0 having the above-described configuration may generate the first output signal DS0' that transitions from a logic low level to a logic high level when the first detection signal DS0 transitions from a logic high level to a logic low level. Particularly, the first output buffer 223_0 may adjust a delay amount of the output signal of the second logic gate NG01 by adjusting a slope of the output signal of the second logic gate NG01 to be more gradual according to the voltage level of the first high bias voltage HB00 when the output signal of the second logic gate NG01 transitions from a logic high level to a logic low level. In addition, as the first output buffer 223_0 outputs the first output signal DS0' through the third logic gate NG02, the first output buffer 223_0 may output the first output signal DS0', whose slope is restored (that is, adjusted to become steep), while the delay amount of the second logic gate NG01 is maintained. Accordingly, it is desirable that the first output buffer 223_0 according to the present example is applied to a readout circuit designed to allow the first detection signal DS0 to transition from the logic high level to the logic low level.

Figure 13:
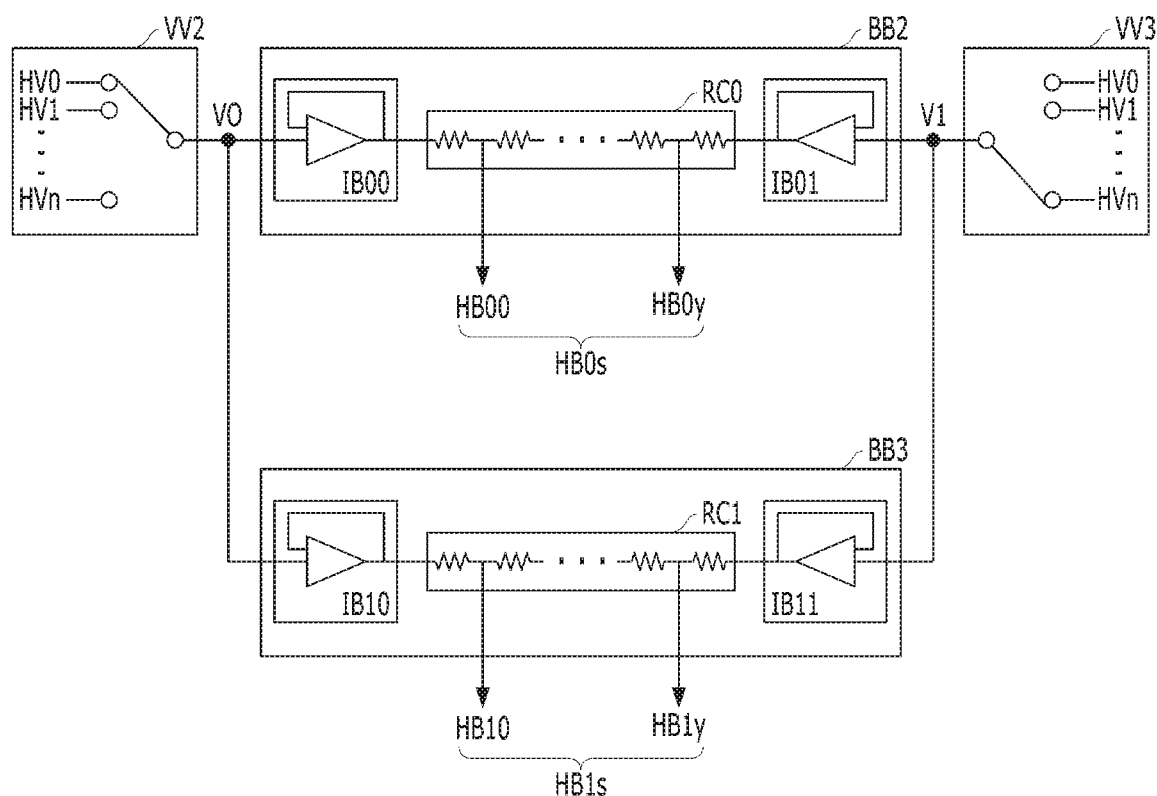
FIG. 13 is a circuit diagram illustrating an example of a first voltage generation circuit, a second voltage generation circuit and a first bias voltage generation circuit, such as those illustrated in FIG. 9.

FIG. 13 is a circuit diagram illustrating the first and second voltage generation circuits VV2 and VV3 and the first and second bias voltage generation circuits BB2 and BB3 illustrated in FIG. 9.

Referring to FIG. 13, the first voltage generation circuit VV2 may generate a plurality of high voltages HV0 to HVn, any one of which may be selected and output as the first voltage V0. For example, the first voltage generation circuit VV2 may generate the plurality of high voltages HV0 to HVn using the high and low power source voltages.

The second voltage generation circuit VV3 may generate a plurality of high voltages HV0 to HVn, one of which (except the one selected as V0) may be selected and output as the second voltage V1. For example, the second voltage generation circuit VV3 may generate the plurality of high voltages HV0 to HVn using the high and low power source voltages.

The first bias voltage generation circuit BB2 may include a first input buffer IB00, a second input buffer IB01 and a first voltage divider RC0. The first input buffer IB00 may receive the first voltage V0. For example, the first input buffer IB00 may include a unit gain amplifier. The second input buffer IB01 may receive the second voltage V1. For example, the second input buffer IB01 may include a unit gain amplifier. The first voltage divider RC0 may be coupled between the first input buffer IM0 and the second input buffer IB01. The first voltage divider RC0 may generate the high bias voltages HB0s of the first group having voltage levels between the first voltage V0 and the second voltage V1. For example, the first voltage divider RC0 may include a plurality of resistors coupled in series to one another.

The second bias voltage generation circuit BB3 may include a third input buffer IB10, a fourth input buffer IB11 and a second voltage divider RC1. The third input buffer IB10 may receive the first voltage V0. For example, the third input buffer IB10 may include a unit gain amplifier. The fourth input buffer IB11 may receive the second voltage V1. For example, the fourth input buffer IB11 may include a unit gain amplifier. The second voltage divider RC1 may be coupled between the third input buffer IB10 and the fourth input buffer IB11. The second voltage divider RC1 may generate the high bias voltages HB1s of the second group having voltage levels between the first voltage V0 and the second voltage V1. For example, the second voltage divider RC1 may include a plurality of resistors coupled in series to one another.

Figure 14:
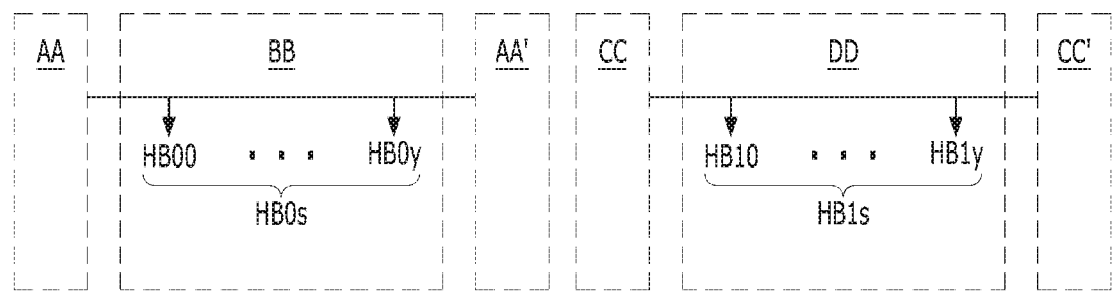
FIG. 14 is a diagram illustrating dispositions of first to $(y+1)^{th}$ output buffers illustrated in FIG. 10 and dispositions of first to fourth input buffers, such as those illustrated in FIG. 13.

FIG. 14 is a diagram illustrating dispositions of the first to $(y+1)^{th}$ output buffers 223_0 to 223_$y$ illustrated in FIG. 10 and dispositions of the first to fourth input buffers IB00, IB01, IB10 and IB11 illustrated in FIG. 13.

Referring to FIG. 14, output buffers of a first group among the first to $(y+1)^{th}$ output buffers 223_0 to 223_$y$ may be disposed in one region BB of the readout region 220. The output buffers of the first group refer to the output buffers which are disposed on one side and correspond to half of the first to $(y+1)^{th}$ output buffers 223_0 to 223_$y$.

The first input buffer IB00 may be disposed in a left region AA of the one region BB.

The second input buffer IB01 may be disposed in a right region AA' of the one region BB.

Output buffers of a second group among the first to $(y+1)^{th}$ output buffers 223_0 to 223_$y$ may be disposed in the other region DD of the readout region 220. The output buffers of the second group refer to the output buffers which are disposed on the other side and correspond to the other half of the first to $(y+1)^{th}$ output buffers 223_0 to 223_$y$.

The third input buffer IB10 may be disposed in a right region CC' of the other region DD.

The fourth input buffer IB11 may be disposed in a left region CC of the other region DD.

Hereinafter, operations of the image sensing device 200 having the above-described configuration according to the second embodiment of the present disclosure are described with reference to FIGS. 15 and 16.

Figure 15:
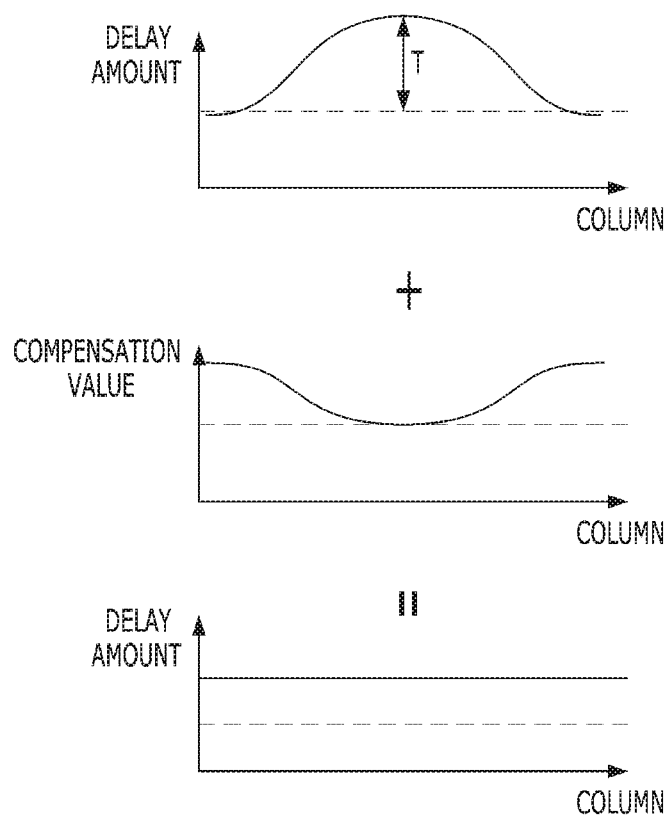
FIG. 15 is a graph for describing an operation related to positive compensation among operations of an image sensing device, such as that illustrated in FIG. 9.

FIG. 15 is a graph for describing an operation related to the positive compensation among the operations of the image sensing device 200 illustrated in FIG. 9.

Referring to FIG. 15, readout deviations T may occur among the plurality of pixel signals PS0 to PSy. More specifically, the readout deviations T may occur among a plurality of detection signals DS0 to DSy. The reason why the graph representing the readout deviations T has a convex shape in the center of the column-axis may be associated with dispositions of the first and second power source supplying circuits PP2 and PP3. In other words, when the first power source supplying circuit PP2 is disposed closest to the first detector 221_0 and the second power source supplying circuit PP3 is disposed closest to a $(y+1)^{th}$ detector 221_$y$, the voltage levels of the high and low power source voltages supplied to a detector becomes more degraded as the receiving detector is disposed closer to the center of a plurality of detectors 221_0 to 221_$y$. The most degraded are the voltage levels of the high and low power source voltages supplied to a detector disposed in the center of a plurality of detectors 121_0 to 121_$y$. Accordingly, the plurality of detection signals DS0 to DSy may be outputted with different delay amounts according to different distances from the first and second power source supplying circuits PP2 and PP3 to the respective detectors, so that the readout deviations T may occur among the plurality of detection signals DS0 to DSy.

The plurality of output buffers 223_0 to 223_$y$ may positively compensate for the readout deviations T among the plurality of detection signals DS0 to DSy based on the plurality of high bias voltages HB0s and HB1s having different voltage levels. For example, the plurality of output buffers 223_0 to 223_$y$ may positively compensate for the readout deviations T among the plurality of detection signals DS0 to DSy by reflecting a delay amount corresponding to a relatively large compensation value to the plurality of detection signals DS0 to DSy as the distances between the first or second power source supplying circuit PP2 or PP3 and the respective detectors decrease, and reflecting a delay amount corresponding to a relatively small compensation value to the plurality of detection signals DS0 to DSy as the distances between the first or second power source supplying circuit PP0 or PP1 and the respective detectors increase. Accordingly, there may be almost no difference in delay amount among the plurality of output signals DS0' to DSy' by reducing or eliminating the readout deviations T among the plurality of detection signals DS0 to DSy according to the positive compensation.

Figure 16:
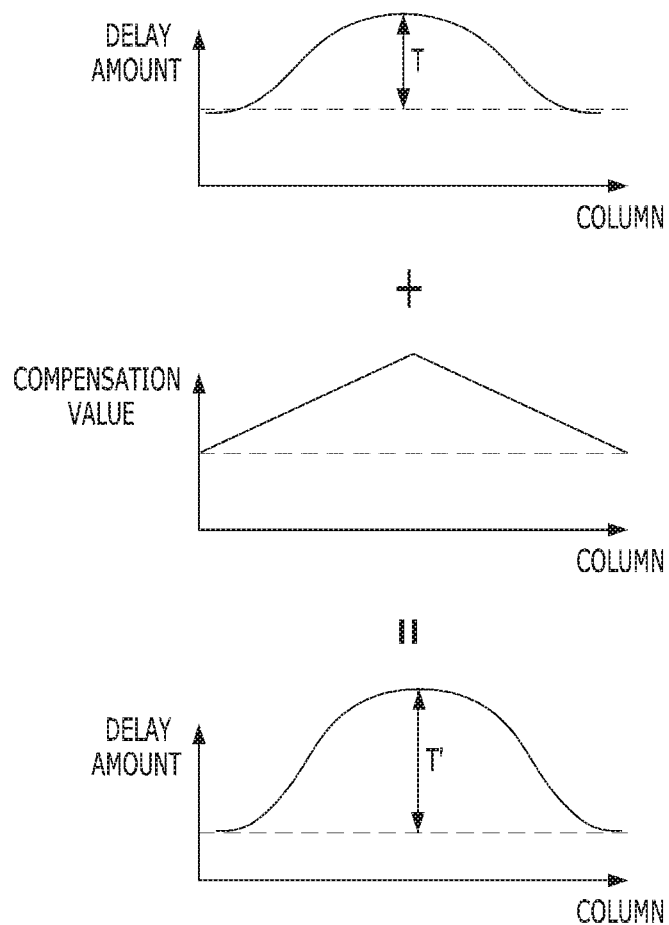
FIG. 16 is a graph for describing an operation related to negative compensation among operations of an image sensing device, such as that illustrated in FIG. 9.

FIG. 16 is a graph for describing an operation related to the negative compensation among the operations of the image sensing device 200 illustrated in FIG. 9.

Referring to FIG. 16, readout deviations T may occur among the plurality of pixel signals PS0 to PSy. More specifically, the readout deviations T may occur among the plurality of detection signals DS0 to DSy. In FIG. 16, the reason why the graph representing the readout deviations T has a convex shape in the center of the column-axis has been described above, and therefore, description thereof is omitted here (refer to FIG. 15).

The plurality of output buffers 223_0 to 223_$y$ may negatively compensate for the readout deviations T among the plurality of detection signals DS0 to DSy based on the plurality of high bias voltages HB0s and HB1s having different voltage levels. For example, the plurality of output buffers 223_0 to 223_y may negatively compensate for the readout deviations T among the plurality of detection signals DS0 to DSy by reflecting a delay amount corresponding to a relatively small compensation value to the plurality of detection signals DS0 to DSy as the distances between the first or second power source supplying circuit PP2 or PP3 and the respective detectors decrease, and by reflecting a delay amount corresponding to a relatively large compensation value to the plurality of detection signals DS0 to DSy as the distances between the first or second power source supplying circuit PP2 or PP3 and the respective detectors increase. Accordingly, readout deviations T' among the plurality of output signals DS0' to DSy' may be increased more than the readout deviations T among the plurality of detection signals DS0 to DSy by increasing or amplifying the readout deviations T among the plurality of detection signals DS0 to DSy according to the negative compensation.

A plurality of counters 225_0 to 225_y may output the plurality of count signals CNT0 to CNTy corresponding to the plurality of output signals DS0' to DSy', respectively. When the plurality of counters 225_0 to 225_y are controlled at similar timings, peak noise may occur due to the plurality of counters 225_0 to 225_y. However, since the readout deviations T' are present among the plurality of output signals DS0' to DSy', the peak noise may be dispersed due to the plurality of counters 225_0 to 225_y.

Figure 17:
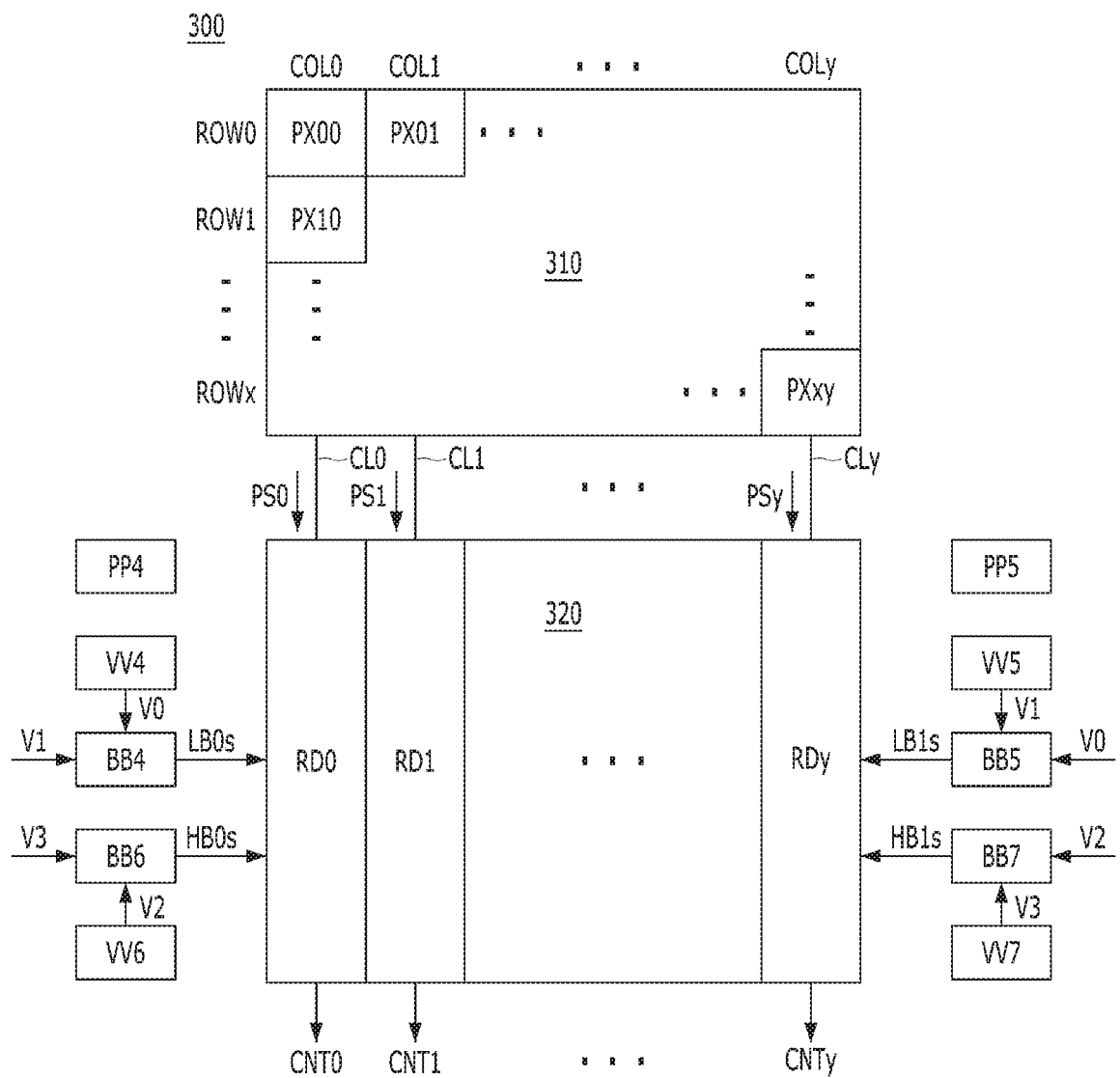
FIG. 17 is a block diagram illustrating an image sensing device in accordance with a third embodiment of the present disclosure.

FIG. 17 is a block diagram illustrating an image sensing device 300 in accordance with a third embodiment of the present disclosure.

Referring to FIG. 17, the image sensing device 300 may include a pixel region 310, a readout region 320, power source supplying regions PP4 and PP5, a first voltage generation circuit VV4, a second voltage generation circuit VV5, a third voltage generation circuit VV6, a fourth voltage generation circuit VV7, a first bias voltage generation circuit BB4, a second bias voltage generation circuit BB5, a third bias voltage generation circuit BB6 and a fourth bias voltage generation circuit BB7.

Since the image sensing device 300 according to the third embodiment of the present disclosure can be understood by the description of the image sensing devices 100 and 200 according to the first and second embodiments above, detailed description of configurations and operations of the image sensing device 300 is omitted.

According to embodiments of the present disclosure, readout deviations among a plurality of pixel signals may be positively compensated, thereby alleviating readout deviations among a plurality of pixel signals, and the readout deviations among the plurality of pixel signals may be negatively compensated, thereby dispersing peak noise generated by latter-end circuits, for example, a plurality of counters.

According to embodiments of the present disclosure, operational reliability may be improved by compensating for degradation in characteristics occurring when a plurality of pixel signals are read out.

While the present invention has been illustrated and described with respect to specific embodiments, the disclosed embodiments are provided as examples, and not intended to be restrictive. Further, it is noted that the present invention may be achieved in various ways through substitution, change, and modification, as those skilled in the art will recognize in light of the present disclosure. The present invention encompasses all such variations that fall within the scope of the claims.

For example, although embodiments of the present disclosure describe a local count type structure in which a plurality of counters are included in a readout region, the present invention is not limited thereto; embodiments may be also applied to a global count type structure in which one counter is included in a region other than the readout region.

What is claimed is:

1. An image sensing device comprising:
   a pixel array including a plurality of pixels arranged in rows and columns, and suitable for outputting a plurality of pixel signals; and
   a plurality of readout circuits coupled to the pixel array, and suitable for compensating for readout deviations among the plurality of pixel signals by directly delaying the plurality of pixel signals by different delay amounts, based on a plurality of bias voltages having different voltage levels, when reading out the plurality of pixel signals.

2. The image sensing device of claim 1, further comprising a bias voltage generation circuit suitable for generating the plurality of bias voltages, using first and second voltages having different voltage levels.

3. The image sensing device of claim 2, wherein the bias voltage generation circuit includes:
   a first input buffer suitable for receiving the first voltage;
   a second input buffer suitable for receiving the second voltage; and
   a voltage divider coupled between the first input buffer and the second input buffer, and suitable for generating the plurality of bias voltages having voltage levels between the first and second voltages.

4. The image sensing device of claim 1, further comprising:
   a low bias voltage generation circuit suitable for generating a plurality of low bias voltages among the plurality of bias voltages, using first and second low voltages having different voltage levels; and
   a high bias voltage generation circuit suitable for generating a plurality of high bias voltages among the plurality of bias voltages, using first and second high voltages having different voltage levels.

5. The image sensing device of claim 4, wherein the low bias voltage generation circuit includes:
   a first input buffer suitable for receiving the first low voltage;
   a second input buffer suitable for receiving the second low voltage; and
   a first voltage divider coupled between the first input buffer and the second input buffer, and suitable for generating the plurality of low bias voltages having voltage levels between the first and second low voltages.

6. The image sensing device of claim 4, wherein the high bias voltage generation circuit includes:
   a third input buffer suitable for receiving the first high voltage;
   a fourth input buffer suitable for receiving the second high voltage; and
   a second voltage divider coupled between the third input buffer and the fourth input buffer, and suitable for generating the plurality of high bias voltages having voltage levels between the first and second high voltages.

7. The image sensing device of claim 1, wherein the plurality of readout circuits positively compensate for the readout deviations among the plurality of pixel signals by decreasing the readout deviations among the plurality of pixel signals.

8. The image sensing device of claim 1, wherein the plurality of readout circuits negatively compensate for the readout deviations among the plurality of pixel signals by increasing the readout deviations among the plurality of pixel signals.

9. An image sensing device comprising:
   a pixel array including a plurality of pixels arranged in rows and columns, and suitable for outputting a first group of pixel signals and a second group of pixel signals for each row;
   a plurality of first readout circuits coupled to the pixel array, and suitable for compensating for readout deviations among the first group of pixel signals, based on a plurality of first bias voltages having different voltage levels according to dispositions of the plurality of first readout circuits, when reading out the first group of pixel signals; and
   a plurality of second readout circuits coupled to the pixel array, and suitable for compensating for readout deviations among the second group of pixel signals according to dispositions of the plurality of second readout circuits, based on a plurality of second bias voltages having different voltage levels, when reading out the second group of pixel signals.

10. The image sensing device of claim 9, further comprising:
   a first low bias voltage generation circuit suitable for generating a plurality of first low bias voltages among the plurality of first bias voltages, using first and second low voltages having different voltage levels;
   a first high bias voltage generation circuit suitable for generating a plurality of first high bias voltages among the plurality of first bias voltages, using first and second high voltages having different voltage levels;
   a second low bias voltage generation circuit suitable for generating a plurality of second low bias voltages among the plurality of second bias voltages, using the first and second low voltages; and
   a second high bias voltage generation circuit suitable for generating a plurality of second high bias voltages among the plurality of second bias voltages, using the first and second high voltages.

11. The image sensing device of claim 10, wherein the first low bias voltage generation circuit includes:
   a first input buffer suitable for receiving the first low voltage;
   a second input buffer suitable for receiving the second low voltage; and
   a first voltage divider coupled between the first input buffer and the second input buffer, and suitable for generating the plurality of first low bias voltages having voltage levels between the first and second low voltages.

12. The image sensing device of claim 10, wherein the first high bias voltage generation circuit includes:
   a third input buffer suitable for receiving the first high voltage;
   a fourth input buffer suitable for receiving the second high voltage; and
   a second voltage divider coupled between the third input buffer and the fourth input buffer, and suitable for generating the plurality of first high bias voltages having voltage levels between the first and second high voltages.

13. The image sensing device of claim 10, wherein the second low bias voltage generation circuit includes:
   a fifth input buffer suitable for receiving the first low voltage;
   a sixth input buffer suitable for receiving the second low voltage; and
   a third voltage divider coupled between the fifth input buffer and the sixth input buffer, and suitable for generating the plurality of second low bias voltages having voltage levels between the first and second low voltages.

14. The image sensing device of claim 10, wherein the second high bias voltage generation circuit includes:
   a seventh input buffer suitable for receiving the first high voltage;
   an eighth input buffer suitable for receiving the second high voltage; and
   a fourth voltage divider coupled between the seventh input buffer and the eighth input buffer, and suitable for generating the plurality of second high bias voltages having voltage levels between the first and second high voltages.

15. The image sensing device of claim 9, wherein the plurality of first readout circuits positively compensate for the readout deviations among the first group of pixel signals by decreasing the readout deviations among the first group of pixel signals, or negatively compensate for the readout deviations among the first group of pixel signals by increasing the readout deviations among the first group of pixel signals.

16. The image sensing device of claim 9, wherein the plurality of second readout circuits positively compensate for the readout deviations among the second group of pixel signals by decreasing the readout deviations among the second group of pixel signals, or negatively compensate for the readout deviations among the second group of pixel signals by increasing the readout deviations among the second group of pixel signals.

17. An image sensing device comprising:
   a pixel array including a plurality of pixels arranged in rows and columns, and suitable for outputting a plurality of pixel signals to respective column lines;
   a plurality of detectors coupled to the respective column lines, and suitable for outputting, to respective output lines, a plurality of detection signals corresponding to respective voltage levels of the plurality of pixel signals; and
   a plurality of output buffers coupled to the respective output lines, and suitable for outputting, to respective readout lines, a plurality of output signals corresponding to the respective detection signals based on respective bias voltages having different voltage levels.

18. The image sensing device of claim 17, wherein each of the plurality of output buffers includes:
   a first logic gate coupled between a supply terminal of a first power source voltage and a supply terminal of a second power source voltage, and suitable for performing a first logic operation on a corresponding detection signal and an enable signal;
   a second logic gate coupled between a first supply node and a second supply node, and suitable for performing a second logic operation on an output signal of the first logic gate;
   a first driving element coupled between the supply terminal of the first power source voltage and the first supply node, and suitable for driving the first supply node with the first power source voltage based on a corresponding bias voltage;
a second driving element coupled between the supply terminal of the second power source voltage and the second supply node, and suitable for driving the second supply node with the second power source voltage based on the first power source voltage; and
a third logic gate coupled between the supply terminal of the first power source voltage and the supply terminal of the second power source voltage, and suitable for outputting a corresponding output signal based on an output signal of the second logic gate.

19. The image sensing device of claim 17, wherein each of the plurality of output buffers includes:
a first logic gate coupled between a supply terminal of a first power source voltage and a supply terminal of a second power source voltage, and suitable for performing a first logic operation on a corresponding detection signal and an enable signal;
a second logic gate coupled between a first supply node and a second supply node, and suitable for performing a second logic operation on an output signal of the first logic gate;
a first driving element coupled between the supply terminal of the first power source voltage and the first supply node, and suitable for driving the first supply node with the first power source voltage based on a corresponding first bias voltage;
a second driving element coupled between the supply terminal of the second power source voltage and the second supply node, and suitable for driving the second supply node with the second power source voltage based on a corresponding second bias voltage; and
a third logic gate coupled between the supply terminal of the first power source voltage and the supply terminal of the second power source voltage, and suitable for outputting a corresponding output signal based on an output signal of the second logic gate.

20. The image sensing device of claim 17, wherein each of the plurality of output buffers includes:
a logic gate coupled between a first supply node and a second supply node, and suitable for performing a logic operation on a corresponding detection signal and an enable signal and outputting a corresponding output signal;
a first driving element coupled between a supply terminal of a first power source voltage and the first supply node, and suitable for driving the first supply node with the first power source voltage based on a corresponding bias voltage; and
a second driving element coupled between a supply terminal of a second power source voltage and the second supply node, and suitable for driving the second supply node with the second power source voltage based on the first power source voltage.

21. The image sensing device of claim 17, wherein each of the plurality of output buffers includes:
a logic gate coupled between a first supply node and a second supply node, and suitable for performing a logic operation on a corresponding detection signal and an enable signal and outputting a corresponding output signal;
a first driving element coupled between a supply terminal of a first power source voltage and the first supply node, and suitable for driving the first supply node with the first power source voltage based on a corresponding first bias voltage; and
a second driving element coupled between a supply terminal of a second power source voltage and the second supply node, and suitable for driving the second supply node with the second power source voltage based on a corresponding second bias voltage.

22. The image sensing device of claim 17, further comprising a bias voltage generation circuit suitable for generating the plurality of bias voltages, using first and second voltages having different voltage levels.

23. The image sensing device of claim 22, wherein the bias voltage generation circuit includes:
a first input buffer suitable for receiving the first voltage;
a second input buffer suitable for receiving the second voltage; and
a voltage divider coupled between the first input buffer and the second input buffer, and suitable for generating the plurality of bias voltages having voltage levels between the first and second voltages.

24. The image sensing device of claim 17, further comprising:
a low bias voltage generation circuit suitable for generating a plurality of low bias voltages among the plurality of bias voltages, using first and second low voltages having different voltage levels; and
a high bias voltage generation circuit suitable for generating a plurality of high bias voltages among the plurality of bias voltages, using first and second high voltages having different voltage levels.

25. The image sensing device of claim 24, wherein the low bias voltage generation circuit includes:
a first input buffer suitable for receiving the first low voltage;
a second input buffer suitable for receiving the second low voltage; and
a first voltage divider coupled between the first input buffer and the second input buffer, and suitable for generating the plurality of low bias voltages having voltage levels between the first and second low voltages.

26. The image sensing device of claim 24, wherein the high bias voltage generation circuit includes:
a third input buffer suitable for receiving the first high voltage;
a fourth input buffer suitable for receiving the second high voltage; and
a second voltage divider coupled between the third input buffer and the fourth input buffer, and suitable for generating the plurality of high bias voltages having voltage levels between the first and second high voltages.

27. An operating method of an image sensing device, the operating method comprising:
generating a plurality of pixel signals which form a readout deviation pattern due to an internal layout within the image sensing device; and
directly delaying at least some of the pixel signals by adjusting slopes of the at least some of the pixel signals based on the readout deviation pattern to reduce or amplify the readout deviation pattern.

* * * * *